J. S. & J. MATTHEWS.
Gate-Latch.
No. 205,404. Patented June 25, 1878.
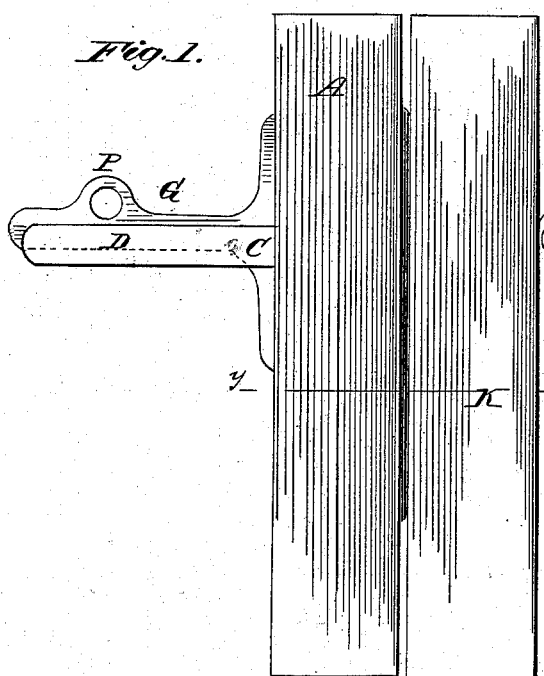
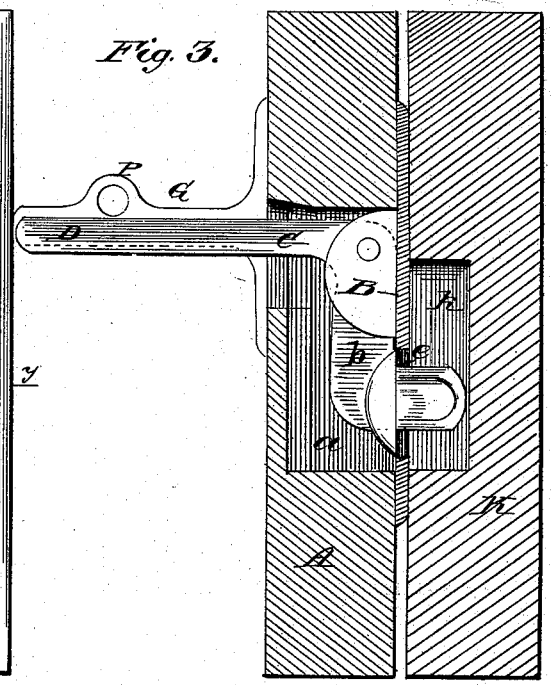
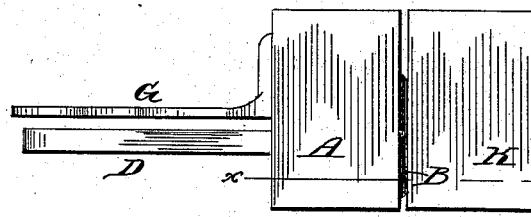
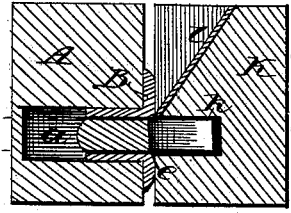
Witnesses:
Fred G. Dieterich
Edward F. Smith
Inventors:
Jacob S. Matthews
and Joseph Matthews
by Louis Bagger & Co.
their Attorneys

UNITED STATES PATENT OFFICE.

JACOB S. MATTHEWS AND JOSEPH MATTHEWS, OF ATHENS, TENNESSEE.

IMPROVEMENT IN GATE-LATCHES.

Specification forming part of Letters Patent No. 205,404, dated June 25, 1878; application filed June 5, 1878.

*To all whom it may concern:*

Be it known that we, JACOB S. MATTHEWS and JOSEPH MATTHEWS, of Athens, in the county of McMinn and State of Tennessee, have invented certain new and useful Improvements in Gate-Latches; and we do hereby declare that the following is a full, clear, and exact description thereof, which will enable others skilled in the art to which it appertains to make and use the same, reference being had to the accompanying drawings, which form a part of this specification, and in which—

Figure 1 is a side view. Fig. 2 is a top view. Fig. 3 is a section on the line $x\,x$, Fig. 2; and Fig. 4 is a section on the line $y\,y$, Fig. 1.

Similar letters of reference denote corresponding parts in all the figures.

This invention relates to certain improvements in gate-latches, as we shall now proceed more fully to describe with reference to the drawings hereto annexed, in which—

A is the end post of the gate, having a recess or slot, $a$, for a lever, C, made preferably of cast metal, in the shape shown in the drawing, from which it will be seen that it has an arm or handle, D, projecting through the slot in the rear side of post A.

The lever is pivoted between two lugs of a plate, B, secured upon the front side of the post, and covering the slot or opening. The lower end or arm $b$ of the lever (which, it will be seen, is Z-shaped) projects through a slot, $e$, in plate B.

G is an arm or guard secured upon post A alongside of and parallel to the long arm or handle D of the lever. The guard G has a perforation or a perforated projection, P, for the purpose which will be hereinafter described.

K is the gate-post, having a mortise, $k$, to accommodate the end $b$ of the lever, which forms the lock. A slope, $l$, leads to the mouth of the mortise, so that when the gate is "slammed," the lever will slide up and close automatically.

The mortise and slope are considerably wider than the end of the lever, so as to allow for the sagging of the gate.

From the foregoing description, taken in connection with the drawings hereto annexed, the operation of our invention will be readily understood. The lever operates automatically by the weight of the arm or handle D. The guard G prevents cattle from opening the gate and straying away, and by inserting a padlock into the perforation P the gate may be locked, as the handle D will by this means be prevented from being raised.

Having thus described our invention, we claim and desire to secure by Letters Patent of the United States—

The gate-latch consisting of the weighted inwardly-swinging lever-arm $b$, bent with a right-angular tooth, and provided with a guard-arm, G, and handle D, substantially as and for the purpose specified.

In testimony that we claim the foregoing as our own we have hereto affixed our signatures in presence of two witnesses.

JACOB S. MATTHEWS.
JOSEPH MATTHEWS.

Witnesses:
ROBT. J. FISHER,
JOHN A. SMITH.